(12) United States Patent
D'Alterio et al.

(10) Patent No.: US 7,966,612 B2
(45) Date of Patent: Jun. 21, 2011

(54) METHOD, SYSTEM AND COMPUTER PROGRAM FOR INSTALLING SHARED SOFTWARE COMPONENTS

(75) Inventors: Domenico D'Alterio, Rome (IT); Francesco Lupini, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 11/278,693

(22) Filed: Apr. 5, 2006

(65) Prior Publication Data

US 2006/0248309 A1 Nov. 2, 2006

(30) Foreign Application Priority Data

Apr. 28, 2005 (EP) .................................... 05103524

(51) Int. Cl.
*G06F 9/44* (2006.01)
(52) U.S. Cl. ......... 717/168; 717/174; 719/331; 719/332
(58) Field of Classification Search ........................ None
See application file for complete search history.

(56) References Cited

U.S. PATENT DOCUMENTS

| | | | | |
|---|---|---|---|---|
| 5,247,681 A | * | 9/1993 | Janis et al. .................... 719/331 |
| 6,100,885 A | * | 8/2000 | Donnelly et al. ............. 715/762 |
| 6,154,878 A | * | 11/2000 | Saboff .......................... 717/173 |
| 6,161,191 A | * | 12/2000 | Slaughter et al. ................ 714/4 |
| 6,370,686 B1 | * | 4/2002 | Delo et al. .................... 717/174 |
| 6,381,742 B2 | * | 4/2002 | Forbes et al. ................. 717/176 |
| 6,637,023 B1 | * | 10/2003 | Ginsberg ...................... 717/122 |
| 2003/0233648 A1 | * | 12/2003 | Earl et al. ..................... 717/176 |
| 2004/0024878 A1 | * | 2/2004 | Makimoto et al. ........... 709/226 |
| 2004/0044694 A1 | * | 3/2004 | Henig et al. .................. 707/200 |
| 2004/0253979 A1 | * | 12/2004 | Burr ........................... 455/552.1 |
| 2005/0060725 A1 | * | 3/2005 | D'Souza et al. .............. 719/331 |
| 2005/0114864 A1 | * | 5/2005 | Surace ......................... 719/310 |

* cited by examiner

*Primary Examiner* — Michael J Yigdall
*Assistant Examiner* — Samuel Hayim
(74) *Attorney, Agent, or Firm* — Garg Law Firm, PLLC; Rakesh Garg; Jeffrey S. LaBaw

(57) ABSTRACT

A method, system, and computer program for installing a shared software component on a computer are proposed. The process is driven by an exploiter of this (new) shared component. If the required shared component is not available on the computer, it is installed at the desired location (specified by the exploiter). On the contrary, if another shared component is already available (for further exploiters), the process verifies whether this available shared component is at the required level. If not, the available shared component is upgraded accordingly; for example, this result can be achieved by causing the available shared component to refuse any new request and then waiting for the completion of any pending request. In this case, the install location of the available shared component is returned to the exploiter, so as to have it point to the available shared component automatically.

12 Claims, 6 Drawing Sheets

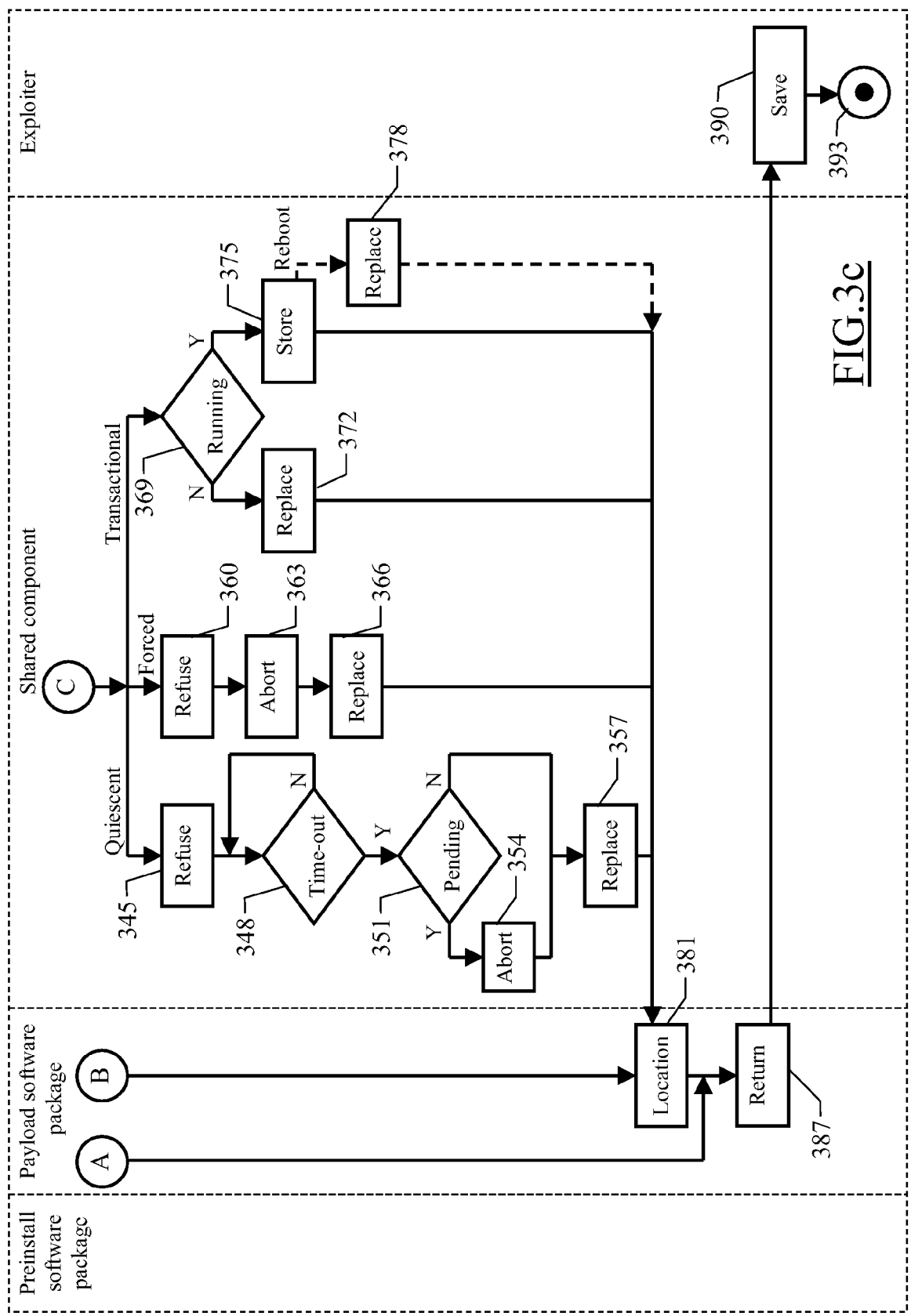

METHOD, SYSTEM AND COMPUTER PROGRAM FOR INSTALLING SHARED SOFTWARE COMPONENTS

FIELD OF THE INVENTION

The present invention relates to the data processing field. More specifically, the present invention relates to the installation of sharable software components on a data processing system.

BACKGROUND ART

The developing of software applications is a very complex and time-consuming activity, especially in modern data processing systems. In order to facilitate this activity, several software engineering techniques have been proposed in the last years.

Particularly, a consolidated practice is of reusing existing software components (rather than creating them ex novo). The possibility of assembling reused components into more complex software applications reduces the developing time and cost; moreover, the reused components are generally largely tested, so that their exploitation results in software applications that are more robust, fault tolerant and reliable. Examples of reused components that have become very popular are object-oriented classes, graphical libraries, and tracing or logging tools.

A problem of the reused components is that they must be embedded into the software applications. Therefore, the same reused component must be copied in every software application. This increases the size of the software applications and involves the replication of any maintenance activity. In addition, the multiple copies of the reused component involve a waste of processing resources for their execution. In any case, the results that are obtained by the different copies of the reused component cannot be shared in any way among the software applications. Those problems are particularly acute when the reused component has a complex structure (for example, when it consists of a software application on its own).

An evolution of the above-described technique consists of providing components that can be shared among multiple software applications (or exploiters). In this way, a single copy of each sharable (or simply shared) component is used and maintained for multiple exploiters, with reduced resource consumption and the possibility of sharing the results obtained.

However, the management of the shared components is decidedly nontrivial. Particularly, no effective solution is available for the installation of the shared components. Indeed, whenever a specific shared component is needed by an exploiter it cannot be installed directly (since the same shared component might be already available). On the other hand, the use of the available shared component involves customizing the (new) exploiter to make it recognize this shared component.

A further problem arises whenever the version of the available shared component is not adequate. In this case, it is necessary to stop all the exploiters that are using the available shared component (in order to prevent the generation of incoherent results). Once the available shared component has been upgraded to the desired version, the exploiters must be restarted individually. In this case as well, the new exploiter must be customized to make it recognize this shared component.

All of the above requires a series of manual operations by an administrator of the system, which operations have a detrimental impact on the productivity and reliability of the process.

SUMMARY OF THE INVENTION

The present invention proposes a solution that shields the exploiters from the actual process of installing the shared components.

Particularly, an aspect of the present invention proposes a method for installing a sharable software component on a data processing system. The method starts by providing a first instance of the component, which is intended to be installed on the system for use by a first application through corresponding first access information. The availability on the system of a second instance of the component (which is shared by one or more second applications) is then verified; the second instance is used by the second applications through second access information. As a result, in response to the non-availability (of the second instance) the first instance is actually installed on the system; otherwise, in response to the availability (of the second instance) the second access information is returned to the first application, so as to cause the first application to use the second instance.

For example, the access information includes an indication of an install location of the corresponding instance (i.e., the new shared component or the available shared component).

In a preferred embodiment of the invention, the available shared component is automatically upgraded to the appropriate level (when necessary).

A suggested choice for achieving this result is to cause the available shared component to refuse any new request and then wait for the completion of any pending request.

As a further enhancement, the pending requests are aborted after a predetermined delay.

In a different embodiment of the invention, the pending requests are aborted immediately.

A way to further improve the solution is to act on requests that are affected by the upgrade only.

Alternatively, the upgrade is performed in a transactional manner.

Advantageously, the installation of the shared component is carried out by means of two software packages (a preinstall software package that verifies the availability of the shared component, and a payload software package that performs the required actions according to the result of the verification).

In a preferred embodiment of the invention, the execution of the method is controlled by a service provider (for example, implementing a software distribution infrastructure).

A further aspect of the present invention proposes a computer program for performing the above-described method.

Moreover, another aspect of the present invention proposes a corresponding data processing system.

The characterizing features of the present invention are set forth in the appended claims. The invention itself, however, as well as further features and the advantages thereof will be best understood by reference to the following detailed description, given purely by way of a non-restrictive indication, to be read in conjunction with the accompanying drawing.

BRIEF DESCRIPTION OF THE DRAWINGS

FIGS. 3a-3c show a diagram describing the flow of activities relating to an implementation of the solution according to an embodiment of the invention.

DETAILED DESCRIPTION

Figure 1A:
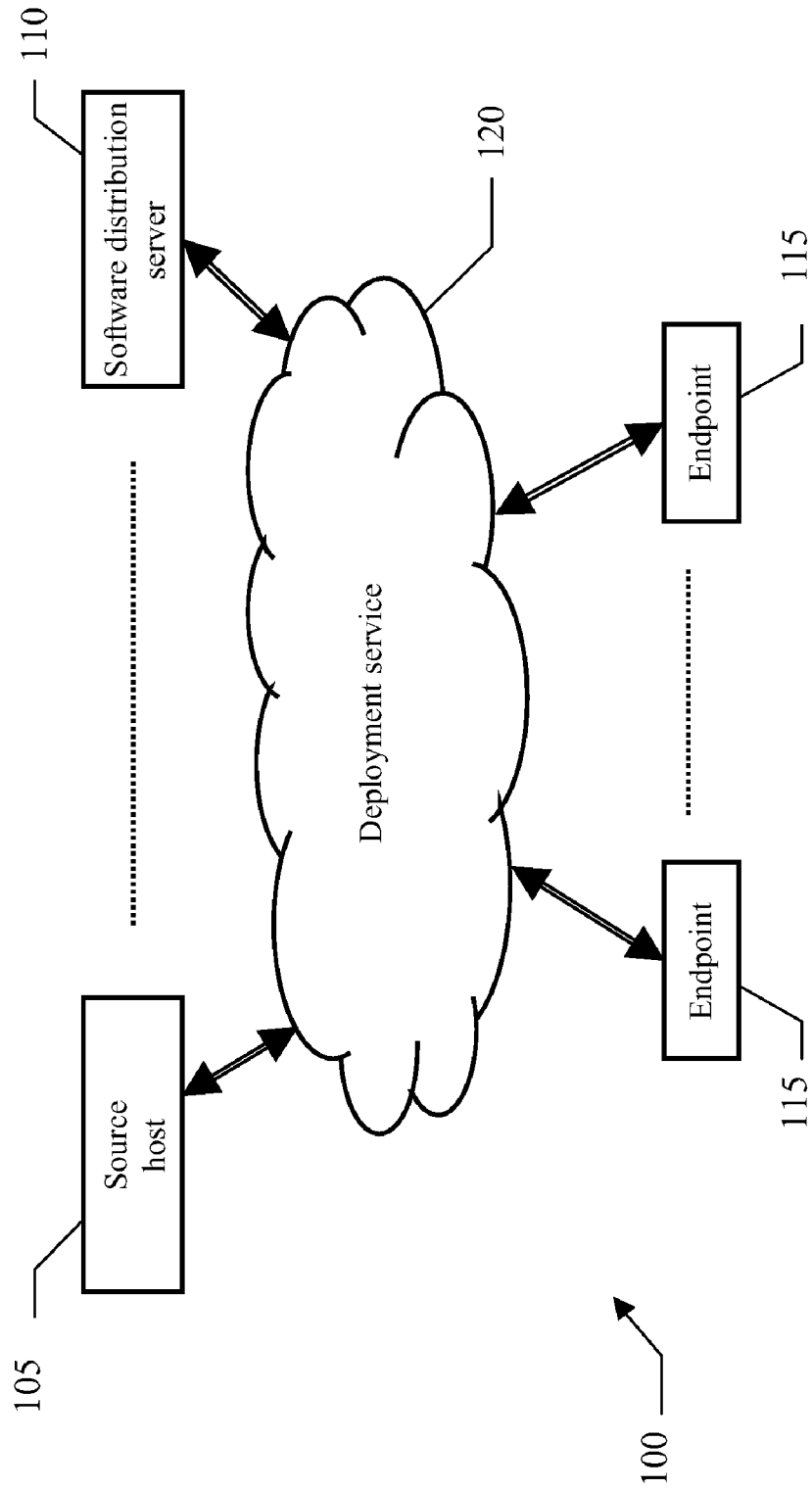
FIG. 1*a* is a schematic block diagram of a data processing system in which the solution according to an embodiment of the invention is applicable.

With reference in particular to FIG. 1a, a data processing system 100 with distributed architecture is illustrated. The system 100 implements a software distribution infrastructure. Particularly, a source host 105 operates as a preparation and testing central site for software products to be distributed throughout the system 100. The source host 105 interfaces with a server 110, which controls the distribution of the software products to multiple endpoints 115. For this purpose, the source host 105, the software distribution server 110 and the endpoints 115 exploit a deployment service 120 (for example, based on the "Multiplexed Distribution or MDIST2" framework by IBM Corporation); the deployment service 120 is implemented by one or more levels of gateways, which act as depots (or repeaters) for the information to be deployed.

Figure 1B:
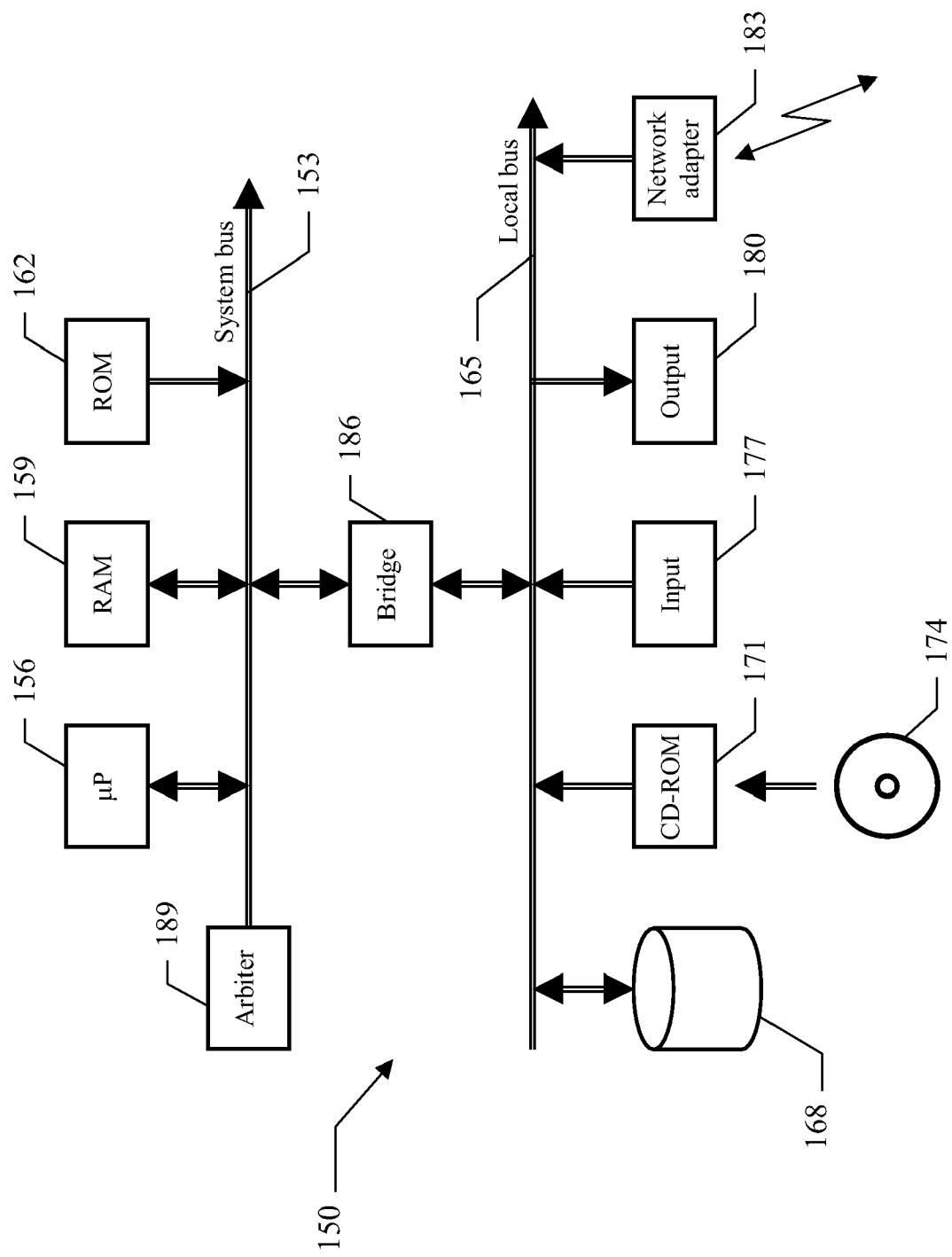
FIG. 1b shows the functional blocks of an exemplary computer of the system.

As shown in FIG. 1b, a generic computer of the system (source host, software distribution server or endpoint) is denoted with 150. The computer 150 is formed by several units that are connected in parallel to a system bus 153. In detail, one or more microprocessors (µP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). An adapter 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
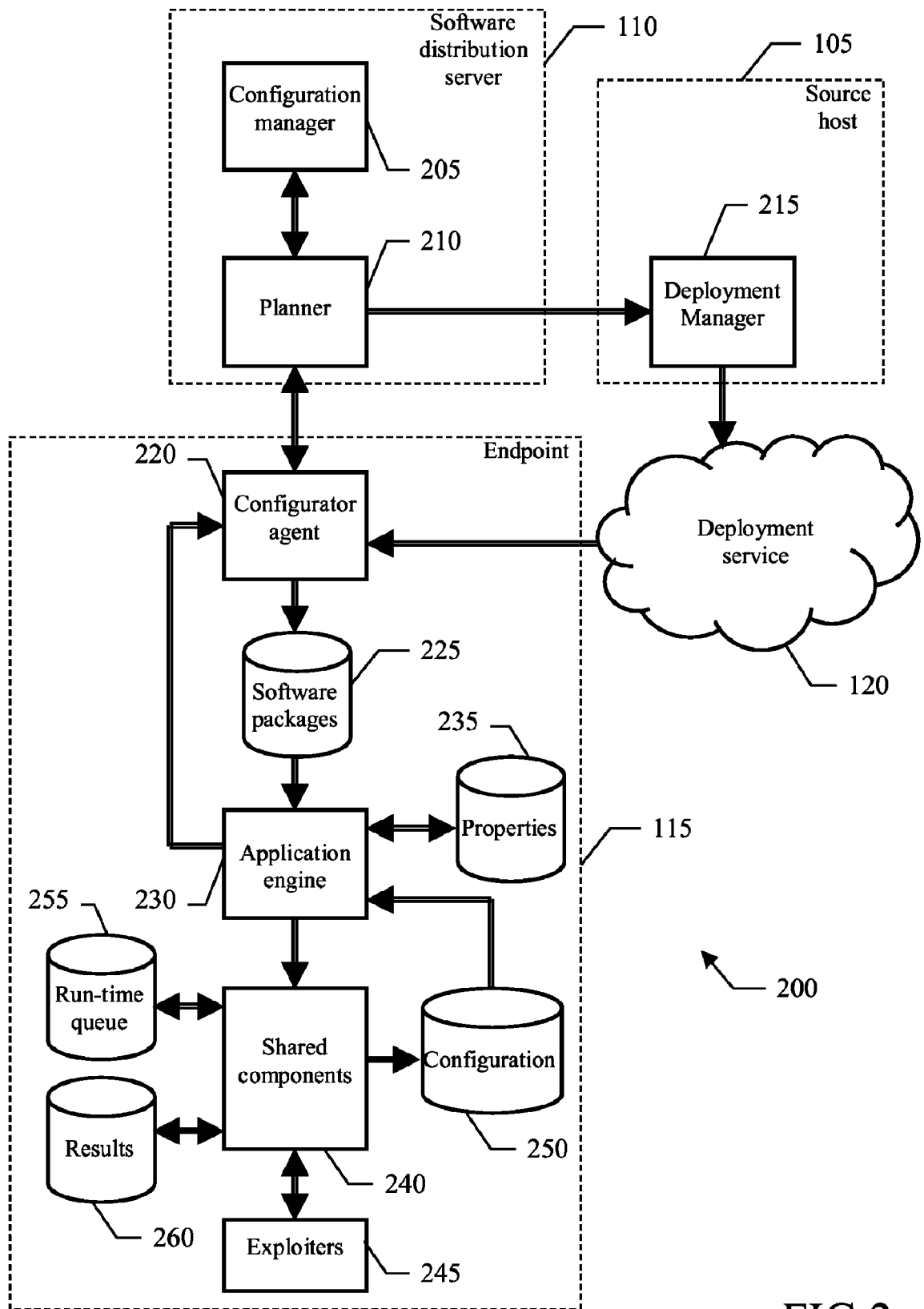
FIG. 2 depicts the main software components that can be used for practicing the solution according to an embodiment of the invention.

Considering now FIG. 2, the main software components that run on the above-described system are denoted as a whole with the reference 200. The information (program and data) is typically stored on the hard-disks and loaded (at least partially) into the corresponding working memories when the program is running. The program is initially installed onto the hard-disks, for example, from CD-ROMs.

With reference in particular to the software distribution server 110, a configuration manager 205 (for example, the "IBM Tivoli Configuration Manager or ITCM" by IBM Corporation) controls the generation of distribution plans for installing desired software products on selected endpoints. Typically, each distribution plan consists of a list of activities to be executed on the endpoints; each activity is specified by a target state of a software package block (or simply software package) that is provided by the source host 105. Examples of possible target states of the software packages are installed and committed, installed in an undoable manner, removed, and so on. Each software package includes an instruction section (also called software package file), which specifies a series of actions to be carried out on the endpoint. Some actions are self-contained (for example, to reboot the endpoint), whereas other actions require an installable object (for example, consisting of a software resource to be added or replaced); in the latter case, the software package also includes an image of the required resource. Moreover, the instruction section can also include variables to be resolved at run-time on the endpoint; for example, those variables can be used to condition the execution of specific actions according to the actual configuration of the endpoint.

Preferably, the configuration manager 205 builds the distribution plan from reference models; each reference model specifies the target state of one or more selected software packages on the endpoints subscribing to it (identified by a role that is defined, for example, by a category of users, by a department, or by specific features). Once known the current configuration of the endpoints in the system, the configuration manager 205 can determine the activities to be performed on each endpoint (associated with a selected reference model) for reaching the target state of each relevant software package (for example, install a software package that is not available or remove a software package that has been previously installed).

The distribution plan so obtained is submitted by the configuration manager 205 to a planner 210, which controls execution of the desired activities on the endpoints. For this purpose, the planner 210 causes a deployment manager 215 running on the source host 105 to make available the required software packages. In response thereto, the deployment manager 215 builds or retrieves those software packages; the software packages are then uploaded to a depot of the deployment service 120 associated with the source host 105. At the same time, the planner 210 instructs a configuration agent 220 running on each endpoint 115 (only one shown in the figure) to download the same software packages from a further depot of the deployment service 120 (associated with the endpoint 105). The software packages so obtained on the endpoint 105 (denoted with 225) are supplied to an application engine 230 (such as the "Software Installation Engine or SIE" by IBM Corporation). The application engine 230 also accesses property files 235, which store the values of any variables of the software packages 225 to be resolved at run-time (for example, with each software package 225 that is associated with a corresponding property file 235 identified according to a predefined naming convention). The module 230 enforces the application of the software packages 225 on the endpoint 115, and logs the results of the actions that have been executed into a local catalogue (not shown in the figure); the same information is also returned as a feedback to the planner 210 (through the configuration agent 220), so as to allow the configuration manager 205 to update the information defining the current configuration of the endpoints in the system.

A preferred implementation of the above-described software distribution infrastructure (and particularly of the software packages) is described in WO-A-003085513, the entire disclosure of which is herein incorporated by reference.

In the example at issue, this software distribution infrastructure is used to install shared software components 240, which can be used by multiple exploiters 245 (running either on the same endpoint 105 or on other computers). Each shared component 240 is associated with a corresponding configuration file 250, which stores corresponding information; typically, this configuration information includes an install location of the shared component 240 and its version, a counter for the number of associated exploiters 245, corresponding execution parameters, and the like. An example of shared component 240 is an inventory tool (such as the "Tivoli Common Inventory Technology or CIT" by IBM Corporation), which is used to scan a file system of the endpoint 105 for detecting the software products that are installed therein; this inventory tool can be invoked by a number of exploiters 245, such as a software distribution application (for example, the above-mentioned ITCM), a licensing application (for example, the "IBM Tivoli Licensing Manager or ITLM" by IBM Corporation), and the like.

For this purpose, the distribution plan will specify corresponding software packages 225 (with the target state set accordingly). Particularly, a (standard) software package 225 is used to install each exploiter 245, which then requires the installation of the desired shared component 240 as a prerequisite. As described in detail in the following, the installation of the shared component 240 is preferably performed by means of two software packages 225. A first (preinstall) software package 225 verifies the availability of the required shared component 240 on the endpoint 105 (through its configuration information stored in the file 250). The preinstall software package 225 decides the course of action accordingly and saves this result into the associated property file 235; for example, the preinstall software package 225 can decide to install the new shared component, to upgrade the available one, or to use it directly. A second (payload) software package 225 actually installs the shared component 240. The instruction section of the payload software package 225 includes all the possible actions that can be executed in the different situations, which actions are conditioned by corresponding variables to be resolved at run-time.

The different exploiters 245 invoke the same shared component 240 by submitting corresponding requests (for example, to scan the file system of the endpoint 105). The requests may be satisfied according to default execution parameters of the shared component 240 stored in its configuration file 250 (for example, specifying the directories to be checked during the scan). Otherwise, each exploiter 245 may set its own execution parameters (which are saved in the same configuration file 250). Alternatively, run-time execution parameters may be passed to the shared component 240 together with each request. The shared component 240 saves an indication of the pending requests (each one involving the creation of a corresponding process) into a run-time queue 255. The results of every request are cached into a buffer 260 (before being returned to the corresponding exploiter 245). In this way, several requests can be satisfied by using the data that is already available in the result buffer 260 (in full or in part); for example, the software products installed on the endpoint 105 can be detected by using the result of a previous scan of the file system, with the possible addition of a delta scan for directories that were not analyzed. In this case as well, exploiter-specific or request-specific execution parameters may be used to define the freshness of the returned data (for example, not older then 1 day, 1 week, and the like); otherwise, default execution parameters of the shared component 240 are used (for example, when the request is submitted by legacy exploiters 245 that are not able to specify those execution parameters).

Figure 3A:
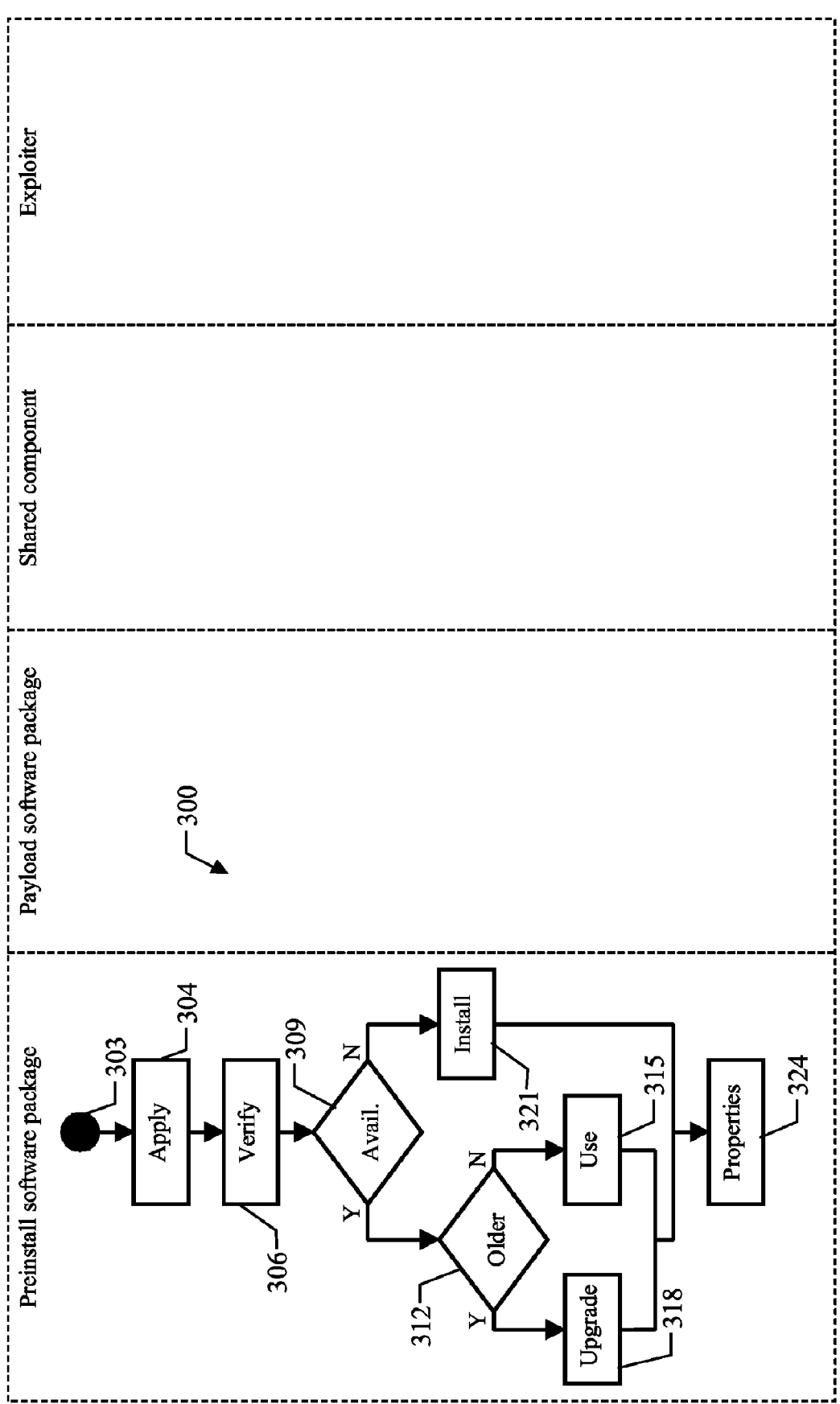
Figure 3B:
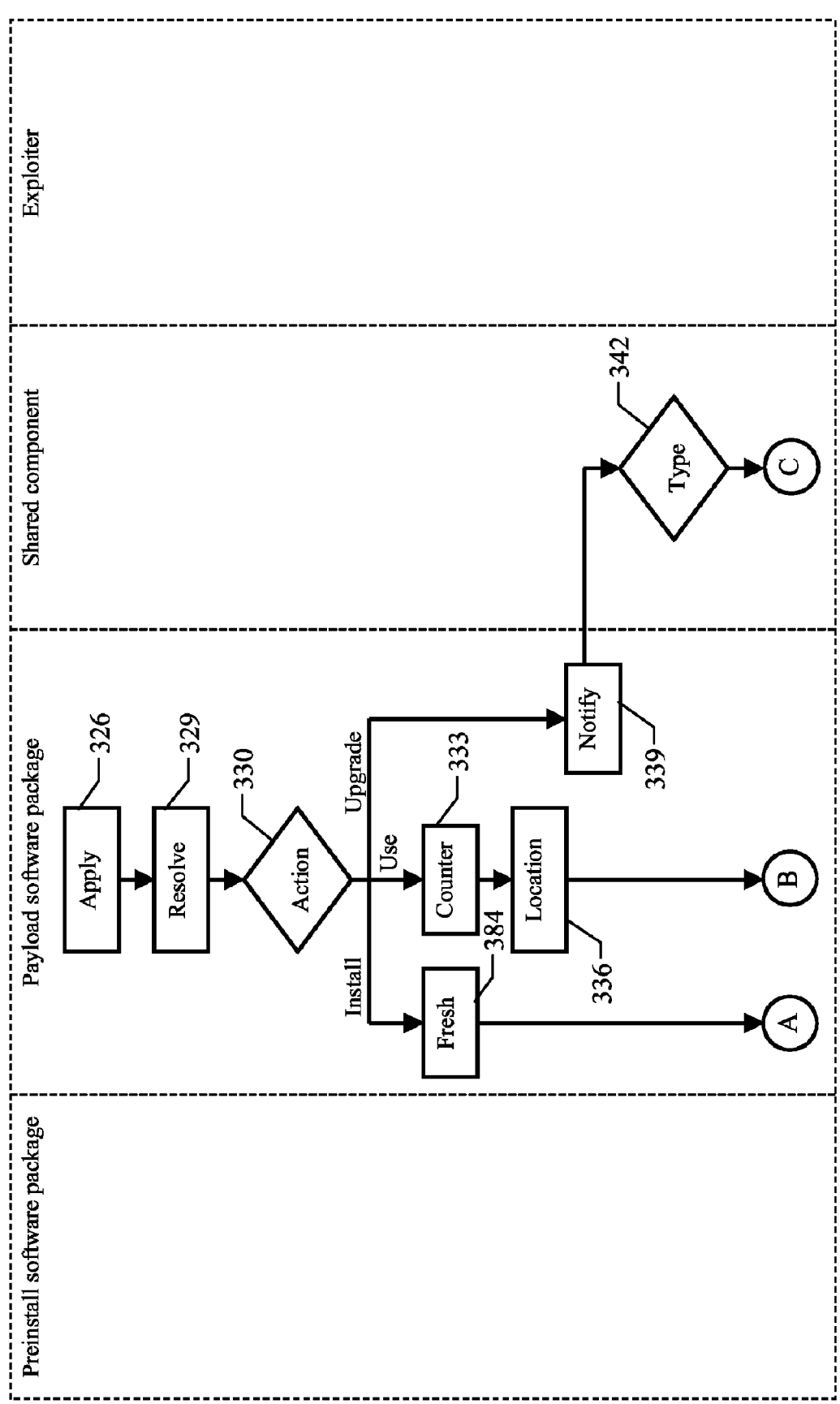

Moving now to FIGS. 3a-3c, the logic flow of a process that can be implemented in the above-described software distribution infrastructure (for installing a generic shared component on a selected endpoint) is represented with a method 300. The method begins at the black start circle 303 and then passes to block 304, wherein the preinstall software package (for the desired shared component) is applied on the endpoint. As a result, the preinstall software package at block 306 verifies the availability of the shared component and its version (through the corresponding configuration file). If (an instance) of the shared component is already available on the endpoint (block 309), a test is made at block 312 to determine whether the version of the available shared component is older than the one of the (new instance) of the shared component to be installed. If not, the preinstall software package at block 315 decides to use the available shared component as is (for the exploiter that required the installation); conversely, the preinstall software package at block 318 decides to upgrade the available shared component to the desired version (assuming that it is backward compatible with the older version). Referring back to block 309, if the shared component is not available on the endpoint the preinstall software package at block 321 decides to install the new shared component. In any case, the flow of activity continues to block 324 (from blocks 315, 318 or 321), wherein the list of values indicating the actions to be performed on the endpoint (i.e., use, upgrade or install) are saved into the property file associated with the shared component.

Moving now to block 326, the payload software package is likewise applied on the endpoint. First of all, the payload software package at block 329 resolves its variables according to the corresponding values stored in the property file. The flow of activity then branches at block 330 accordingly. Particularly, if the available shared component must be used as is the blocks 333-336 are executed, if the available shared component must be upgraded the blocks 339-381 are executed, whereas if the new shared component must be installed the block 384 is executed. In any case, the method joints at block 387.

With reference in particular to block 333 (use), the counter of the exploiters that are using the shared component is incremented by one. The configuration information of the available shared component that is required for its access (for example, the install location) is then extracted from the corresponding file at block 336.

Considering instead block 339 (upgrade), the payload software package notifies the available shared component accordingly. At the same time, the payload software package provides a response file storing parameters for customizing the operation to be performed. For example, the response file includes a parameter specifying the desired type of upgrade to be executed; as it will be apparent in the following, the payload software package may select to perform the upgrade in a quiescent mode (setting a further parameter defining a corresponding time-out), in a forced mode, or in a transactional mode. Moreover, the response file includes a parameter specifying the category of requests supported by the available shared component that should be affected by the upgrade (since they run one or more modules of the available shared component to be replaced). In response thereto, the flow of activity branches at block 342 (in the swim-lane of the available shared component) according to the selected type of upgrade. Particularly, if the upgrade must be performed in the quiescent mode the blocks 345-357 are executed, if the upgrade must be performed in the forced mode the blocks 360-366 are executed, whereas if the upgrade must be performed in the transactional mode the blocks 369-378 are executed (with the method then passing to block 381 in any case).

More in detail, in the quiescent mode the available shared component at block 345 enters an inactive condition for the requests belonging to the affected category (specified in the response file); in this condition, the available shared component refuses any new request of the affected category that is received from the associated exploiters (for example, by returning an error code), while the requests of the other (non-affected) categories are served normally. The method then enters a waiting loop at block 348. As soon as a delay defined by the time-out specified in the response file expires (for example, some minutes) or all the pending requests end their execution, the flow of activity descends into the test block 351. If one of more requests of the affected category are still pending (as indicated in the run-time queue), those requests are aborted at block 354 (by returning an error code to the corresponding exploiters); the method then continues to block 357. The same point is also reached from block 351 directly when no request of the affected category is pending. Considering now block 357, the available shared component can be upgraded to the desired version (by replacing the corresponding modules); at the same time, the counter of the exploiters that are using the shared component is incremented by one. Operation of the (upgraded) shared component is then restarted normally.

In the forced mode as well, the available shared component at block 360 enters the same inactive condition (for the requests belonging to the affected category specified in the response file). All the pending requests (if any) of the affected category (as indicated in the run-time queue) are immediately aborted at block 363 (by returning the same error code to the corresponding exploiters). The available shared component can now be upgraded at block 366 to the desired version (by replacing the corresponding modules and incrementing the counter of the exploiters) and then restarted as in the preceding case.

At the end, in the transactional mode a test is made at block 369 to determine whether the available shared component is running. If not, the available shared component is immediately upgraded at block 372 to the desired version. Conversely, a list of the actions required for upgrading the available shared component is simply stored on the endpoint at block 375 (for example, in a dedicated staging area of the hard-disk). Therefore, when the endpoint is rebooted (in a completely asynchronous manner), those actions will be executed on the endpoint at block 378 so as to actually upgrade the available shared component.

In this way, the available shared component is automatically upgraded to the desired version with a process that is completely opaque to the exploiter requiring its installation. Moreover, it should be noted that the whole operation is performed by the available shared component itself (under the control of the payload software package); therefore, the exploiter is shielded from its actual implementation. The above-described operation also has a granularity defined by the requests that are affected by the upgrade. As a result, it is possible to reduce the impact of the upgrade on the productivity of the available shared component to the minimum; indeed, all the other requests that are not affected by the upgrade can be processed concurrently, without adversely affecting operation of the exploiters that submit them.

In every case, the method then continues to block 381 in the swim-lane of the payload software package (from blocks 357, 366, 372 or 375). In this phase, the configuration information of the available shared component that is required for its access (i.e., the install location) is likewise extracted from the corresponding file.

With reference at the end to block 384 (install), the new shared component is freshly installed on the endpoint. The process is performed according to configuration information specified by the payload software package (as required by the corresponding exploiter); otherwise, internal default values of the new shared component are used for any piece of configuration information that has not been customized. At the same time, the counter of the exploiters that are using the shared component is initialized to one.

Considering now block 387, the payload software package returns information about the result of the operation to the exploiter (which required the installation of the new shared component). As usual, this information includes a return code indicating whether the installation was successfully. In addition, the payload software package also returns the configuration information for accessing the available shared component (when it is the case); moreover, if the upgrade in the transactional mode was not possible immediately (because the available shared component was running), the return code is set to a corresponding warning value (indicating that the desired version of the shared component is not available yet).

The exploiter saves the information received from the payload software package at block 390. As a result, the exploiter will access the new shared component through the configuration information that was selected (or through the default one of the new shared component) when this new shared component was freshly installed. Conversely, the exploiter will access the available shared component (either as is or upgraded to the desired version) through the configuration information that was returned. The method then ends at the concentric white/black stop circles 393.

In this way, the exploiter is shielded from the actual installation process of the shared component. Indeed, the exploiter is automatically configured to point to the shared component to be used (irrespective of the actions that have been performed on the endpoint). This result is achieved without any manual intervention, with a beneficial impact on the productivity and reliability of the process.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include equivalent elements (such as cache memories temporary storing the program or a part thereof to reduce the accesses to the mass memory during execution); in any case, it is possible to replace the computer with any code execution entity (such as a PDA, a mobile phone, and the like).

Without departing from the principles of the invention, the proposed solution is suitable to be applied for installing any other software component that is adapted to be shared among any other exploiters.

Although not specified in order not to obscure the description of the invention with unnecessary particulars, it is emphasized that the proposed solution also supports different scenarios where the shared component does not work in a native mode but it is accessed through a broker (interfacing it with the different exploiters); in this case, the process of installing the shared component controls the provision of any prerequisites that are needed by the shared component. A typical example is when the shared component is installed as a service that can be accessed through a common agent (providing a single run-time environment for multiple services).

Alternatively, the decision of upgrading the available shared component can be based on the patches that have been applied, or more generally on any other indicator or its level.

Similar considerations apply if the pending requests are aborted after a different delay, or if any other number of categories of requests is supported by the available shared component.

Alternatively, different software packages (such as built using the "ISMP" by InstallShield Corporation) may be used to install the exploiters with the corresponding shared components.

Even though in the preceding description reference has been made to a specific service that is deployed by a corresponding provider, this is not to be intended as a limitation (with the execution of the same process that can be controlled by any other entity); for example, it is possible to provide the service through a web site from which the required information is downloaded on-demand, from an internal server in a private network, and the like.

Similar considerations apply if the program is structured in a different way, or if additional modules or functions are provided; likewise, the different memory structures may be of different types, or may be replaced with equivalent entities (not necessarily consisting of physical storage media). Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast structures, and the like; for example, the medium may be of the electronic, magnetic, optical, electromagnetic, infrared, or semi-conductor type.

Moreover, it will be apparent to those skilled in the art that the additional features providing further advantages are not essential for carrying out the invention, and may be omitted or replaced with different features.

For example, the payload software package may return other access information for the available shared component (such as its loading mode) to the exploiter.

In any case, a simplified version of the proposed solution that does not support the automatic upgrade of the available shared component is not excluded (even if it is far less advantageous).

It is emphasized that the principles of the invention should not be limited to the described implementation of the upgrade operation; for example, in alternative embodiments of the invention the upgrade may fail whenever the available shared component is running, or the same event may occur when some requests are still pending at the expire of the time-out (in the quiescent mode).

The proposed invention also has equal application with shared components that support a single category of requests only (so that they are refused and/or aborted indiscriminately).

In any case, an implementation based on a single software package (which performs the operations of both the preinstall software package and the payload software package) is not excluded.

Alternatively, the same solution can be applied in a stand-alone computer, for example, through a software package that is loaded onto the computer from CD-ROM.

In any case, the present invention lends itself to be carried out with a hardware structure (for example, integrated in chips of semiconductor material), or with a combination of software and hardware.

The invention claimed is:

1. A method for installing a sharable software component on a data processing system, the method including the steps of:
   providing a first instance of the component for use by a first application through corresponding first access information;
   verifying the availability on the system of a second instance of the component being shared by at least one second application, the second instance being used by the at least one second application through second access information;
   in response to the non-availability installing the first instance on the system; and
   in response to the availability,
      comparing a first level of the first instance with a second level of the second instance, and upgrading the second instance to the first level in response to the second level being lower than the first level, wherein the upgrading causes the second instance to refuse each new request from the at least one second application, and wherein the upgrading further causes the second instance to wait for the completion of each pending request being previously submitted by the at least one second application, and
      returning the second access information to the first application to cause the first application to use the second instance.

2. The method according to claim 1, wherein the first access information and the second access information include an indication of an install location of the first instance and of the second instance, respectively.

3. The method according to claim 1, wherein the step of waiting includes:
   aborting each pending request after a predetermined delay.

4. The method according to claim 1, wherein the step of upgrading includes:
   causing the second instance to refuse each new request from the at least one second application; and
   aborting each pending request being previously submitted by the at least one second application.

5. The method according to claim 1, wherein the second instance is suitable to receive requests each one belonging to a first category being affected by the upgrading or to a second category being not affected by the upgrading, each new request and each pending request belonging to the first category.

6. The method according to claim 1, wherein the step of upgrading includes:
   storing an indication of actions to be performed on the system for upgrading the second instance to the first level; and
   causing the execution of said actions at a reboot of the system.

7. The method according to claim 1, wherein the step of verifying the availability is performed by a first software package, the first software package storing an indication of the result of the verification on the system, and wherein the step of installing the first instance or returning the second access information is performed by a second software package in response to the result of the verification being retrieved from the system.

8. The method according to claim 1, wherein the step of verifying the availability is performed by a first software package, the first software package storing an indication of the result of the verification on the system, and wherein the step of installing the first instance or returning the second access information is performed by a second software package in response to the result of the verification being retrieved from the system.

9. The method according to claim 1, wherein the execution of the steps of the method is controlled by a service provider.

10. A computer program product including a computer-usable non-transitory storage medium embodying a computer program, the computer program when executed on a data processing system causing the system to perform a method for installing a sharable software component on the system, the method including the steps of:

providing a first instance of the component for use by a first application through corresponding first access information;

verifying the availability on the system of a second instance of the component being shared by at least one second application, the second instance being used by the at least one second application through second access information;

in response to the non-availability installing the first instance on the system; and in response to the availability,
comparing a first level of the first instance with a second level of the second instance, and upgrading the second instance to the first level in response to the second level being lower than the first level, wherein the upgrading causes the second instance to refuse each new request from the at least one second application, and wherein the upgrading further causes the second instance to wait for the completion of each pending request being previously submitted by the at least one second application, and returning the second access information to the first application to cause the first application to use the second instance.

11. A data processing system including:

a storage device including a non-transitory storage medium, wherein the storage device stores computer usable program code; and a processor, wherein the processor executes the computer usable program code, and wherein the computer usable program code comprises:

computer usable code for providing a first instance of a shareable software component for use by a first application through corresponding first access information;

computer usable code for verifying the availability on the system of a second instance of the component being shared by at least one second application, the second instance being used by the at least one second application through second access information; and computer usable code for installing the first instance on the system in response to the non-availability; and computer usable code for, in response to the availability,
comparing a first level of the first instance with a second level of the second instance, and upgrading the second instance to the first level in response to the second level being lower than the first level, wherein the upgrading causes the second instance to refuse each new request from the at least one second application, and wherein the upgrading further causes the second instance to wait for the completion of each pending request being previously submitted by the at least one second application, and returning the second access information to the first application to cause the first application to use the second instance.

12. A data processing system including:

a first software package stored in a first computer-usable non-transitory storage medium for providing a first instance of a shareable software component for use by a first application through corresponding first access information and for verifying the availability on the system of a second instance of the component being shared by at least one second application, the second instance being used by the at least one second application through second access information; and a second software package stored in a second computer-usable non-transitory storage medium for installing the first instance on the system in response to the non-availability, or in response to the availability, for comparing a first level of the first instance with a second level of the second instance, and upgrading the second instance to the first level in response to the second level being lower than the first level, wherein the upgrading causes the second instance to refuse each new request from the at least one second application, and wherein the upgrading further causes the second instance to wait for the completion of each pending request being previously submitted by the at least one second application and returning the second access information to the first application to cause the first application to use the second instance.

* * * * *